United States Patent [19]

Satomi

[11] Patent Number: 5,528,090
[45] Date of Patent: Jun. 18, 1996

[54] LINEAR PULSE MOTOR

[75] Inventor: Hirobumi Satomi, Kashiwa, Japan

[73] Assignee: Oriental Motor Co., Ltd., Tokyo, Japan

[21] Appl. No.: 233,636

[22] Filed: Apr. 26, 1994

[30] Foreign Application Priority Data

Apr. 27, 1993 [JP] Japan .................................. 5-100810

[51] Int. Cl.$^6$ .................................................. H02K 41/02
[52] U.S. Cl. ............................................ 310/12; 318/135
[58] Field of Search ................................. 310/12, 13, 14, 310/49 A, 49 R; 318/135

[56] References Cited

U.S. PATENT DOCUMENTS

| | | | |
|---|---|---|---|
| 4,335,338 | 6/1982 | Sawyer | 318/135 |
| 5,374,865 | 12/1994 | Yoshimura et al. | 310/49 R |
| 5,418,413 | 5/1995 | Satomi | 310/12 |

FOREIGN PATENT DOCUMENTS

| | | |
|---|---|---|
| 0319096 | 6/1987 | European Pat. Off. . |
| 0482321 | 4/1992 | European Pat. Off. . |

OTHER PUBLICATIONS

IEEE Industry Applications Society, 8, Jan. 1992, "Linear Pulse Motors for Accurate Positioning" by Y. Takeda, et al.
Patent Abstracts of Japan, vol. 11, No. 204, Jul. 2, 1987, and JP A-62 025 867, Feb. 3, 1987.
Patent Abstracts of Japan, vol. 13, No. 198, May 11, 1989 and JP A-01 019 958, Jan. 24, 1989.

Primary Examiner—Steven L. Stephan
Assistant Examiner—Judson H. Jones
Attorney, Agent, or Firm—McAulay Fisher Nissen Goldberg & Kiel

[57] ABSTRACT

It is an object of the present invention to provide a linear pulse motor capable of being configured even if the number of salient poles of a stator is odd and having increased ampere-conductors of a winding and large driving force. The linear pulse motor includes a stator having a plurality of salient poles 11, 12, ... 15 disposed at equal pitch angle and having an inner peripheral surface on which teeth 16 are formed in the direction of a shaft 16, and a mover 2 disposed movably in the shaft direction. A stator core 10 includes stator iron plates 30 laminated while rotated successively by the equal pitch angle of the salient poles. When k is an integer equal to or larger than 1, m is the number of phases, and n is equal to or smaller than m/2 and nearest to m/2, the stator iron plates 30 has km salient poles P1, P2, ... P5. The stator iron plates 30 include k sets of salient poles each set including n salient poles having a small inner radius and (m-n) salient poles having a large inner radius arranged in order of the description being formed in top ends of the salient poles opposite to the mover as viewed from the side of the mover.

4 Claims, 4 Drawing Sheets

LINEAR PULSE MOTOR

FIELD OF THE INVENTION AND RELATED ART STATEMENT

The present invention relates to a linear pulse motor.

FIG. 7 is a longitudinal sectional view of a cylinder type linear pulse motor relating to the present invention.

The cylinder type linear pulse motor shown in FIG. 7 includes a stator 100 composed of cores 101, 102, 103 and 104 each formed into a stepped ring having an outer peripheral portion which is thick in the thickness direction thereof and a plurality of stator teeth 105 are formed on an inner peripheral surface of the core at equal pitch in the direction of a shaft of the motor. The cores 101, 102, 103 and 104 are supported by a frame 116 and housed therein.

A ring winding 106 is held in a ring groove formed by combining the stator cores 101 and 102 so that the outer peripheral portions thereof come into contact with each other. Similarly, a ring winding 107 is also held in a ring groove formed between the stator cores 103 and 104.

The cylinder type linear pulse motor has two phases in total with one phase being constituted by the stator cores 101 and 102 and the ring winding 106 and the other phase being constituted by the stator cores 103 and 104 and the ring winding 107.

A ring permanent magnet 108 is held between the stator cores 101, 102 and 103, 104 constituting the two phases and is magnetized in the direction of the shaft of a mover 109.

A core 110 of the mover 109 is cylindrical and includes a plurality of mover teeth 111 disposed on an outer periphery thereof at equal pitch in the shaft direction. The mover 109 is supported by brackets 112 and 113 through bearings 114 and 115.

The stator teeth 105 and the mover teeth 111 have the following positional relation.

That is, when the stator teeth 105 disposed in the stator core 104 is just opposite to the mover teeth 111, the stator teeth 105 disposed in the stator core 103 are shifted by ²⁄₄ of a tooth pitch in the shaft direction relative to the stator core 104. Further, the stator teeth 105 disposed in the stator core 102 are shifted by ¼ of the tooth pitch in the shaft direction relative to the stator core 104. In addition, the stator teeth 105 disposed in the stator core 101 are shifted by ¾ of the tooth pitch in the shaft direction relative to the stator core 104.

With such a structure, the cylinder type linear pulse motor constitutes a two-phase hybrid type linear pulse motor.

However, since the cylinder type linear pulse motor structured above can not increase a winding receiving portion and ampere-conductors per phase, the driving force of the linear pulse motor is small. Further, since the stator cores 101 and 104 are more distant from the permanent magnet 108 than the stator cores 102 and 103, the magnetic circuit is uneven and the driving force is different depending on an excited phase. Further, since the phases are disposed in the shaft direction theoretically, the length of the motor in the shaft direction is long. In addition, since the permanent magnet 108 is disposed on the side of the stator 100, the motor casing is required and at the same time since it is necessary that the length of the mover 109 in the shaft direction is longer than that of the stator 100 in the shaft direction, the inertia of the mover 109 is increased.

Accordingly, a linear pulse motor which has solved the above problems has been already proposed by the inventor and a shape of a stator iron plate forming the stator core is disclosed as follows.

When k is an positive integer and m is the number of phases, the stator iron plate forming the stator core includes 2km salient poles composed of k sets of salient poles each set of m salient poles forming tooth tops of the stator teeth and m salient poles forming tooth bottoms of the stator teeth arranged successively in an inner peripheral direction of the stator iron plate (Japanese Patent Application Nos. 332761/1992 and 340280/1992).

However, the linear pulse motor with the above structure has the following problems.

(1) When the number of salient poles is odd, it can not be configured.

(2) When k=1 and the number of phases m=5, for example, the number of salient poles is 10, a pitch of the stator teeth of the salient poles formed opposite to the mover is $2kmt_0$ (where $t_0$ is a thickness of the stator iron plate) or $10t_0$, tooth width is $mt_0$ or $5t_0$, and a basis amount of movement in each step is $1/(2m)$ of the tooth pitch or $t_0$.

Accordingly, when a tooth depth (whole tooth depth) corresponding to the tooth width is to be ensured, it is necessary to increase an inner radius of the salient poles in the stator iron plate forming the tooth bottoms. Consequently, a space of the winding receiving portion is narrow and the ampere-conductors per phase are reduced. Conversely, when the tooth depth is made small, leakage of magnetic flux is increased and an output is reduced.

OBJECT AND SUMMARY OF THE INVENTION

The present invention has been made in view of the above problems and an object of the present invention is to solve the above problems and provide a linear pulse motor capable of being configured even when the number of salient poles of a stator is odd.

Another object of the present invention is to provide a linear pulse motor capable of increasing ampere-conductors per phase and having large driving force.

In order to achieve the above objects, a linear pulse motor including a stator having a stator core provided with a plurality of salient poles disposed at equal pitch angle to be directed inward radially and a plurality of stator teeth disposed in a direction of a shaft in inner peripheral surfaces of said salient poles, a mover having a mover core supported in said stator movably in the shaft direction and provided with a plurality of mover teeth formed in an outer peripheral surface thereof at equal pitch in opposing relationship with said stator teeth, and a permanent magnet held intermediate of said stator core or said mover core and magnetized in the shaft direction, is characterized as follows:

(1) The stator core comprises stator iron plates being laminated while rotated successively by the equal pitch angle of the salient poles and when k is an integer equal to or larger than 1, m is the number of phase and n is an integer equal to or smaller than m/2 and nearest to m/2, the stator iron plates include km salient poles, k sets of salient poles each set including n salient poles having a small inner radius and (m-n) salient poles having a large inner radius as seen from the side of the mover, the top ends of the salient poles being so arranged successively in turn as to confront the mover.

(2) A five-phase hybrid type linear pulse motor for k=1 or 2, m=5 and n=2 is configured.

(3) Stator iron plates of the stator core include 5k salient poles when k is an integer equal to or larger than 1, and k sets of salient poles each set including 2 salient poles having a small inner radius and 3 salient poles having a large inner radius arranged are formed in top ends of the salient poles opposite to the mover as viewed from the side of the mover, an angle between the two salient poles having a small inner radius of the salient poles constituting the set being 144/k degrees, the stator core including the stator iron plates laminated while rotated successively by 144/k degrees.

According to the present invention, the linear pulse motor can be configured for odd salient poles of the stator and the stator windings are wound on the salient poles in the peripheral direction of the stator. Accordingly, the linear pulse motor can increase the ampere-conductors and has large driving force with small structure. Further, the stator core can be formed by laminating the stator iron plates with the plates rotated successively by the pitch angle of the salient poles or a predetermined angle.

As apparent from the foregoing description, according to the linear pulse motor of the present invention, the stator core comprises stator iron plates being laminated while rotated successively by the equal pitch angle of the salient poles and when k is an integer equal to or larger than 1, m is the number of phase and n is an integer equal to or smaller than m/2 and nearest to m/2, the stator iron plates include km salient poles. K sets of salient poles each set including n salient poles having a small inner radius and (m-n) salient poles having a large inner radius as seen from the side of the mover, the top ends of the salient poles being so arranged successively in turn as to confront the mover. Accordingly, the present invention can be applied to the linear pulse motor having odd salient poles of the stator core.

Further, since the stator windings are wound on the salient poles in the peripheral direction of the stator, the linear pulse motor capable of increasing ampere-conductors per phase and having large driving force and high resolution can be obtained.

In addition, since the stator core can be formed by laminating the stator iron plates with the plates rotated successively by the pitch angle of the salient poles, the laminated core technique for the conventional rotation type stepping motor can be applied and the productivity is also excellent.

DETAILED DESCRIPTION OF A PREFERRED EMBODIMENT

A preferred embodiment of the present invention is now described in detail exemplarily with reference to the accompanying drawings.

Figure 1:
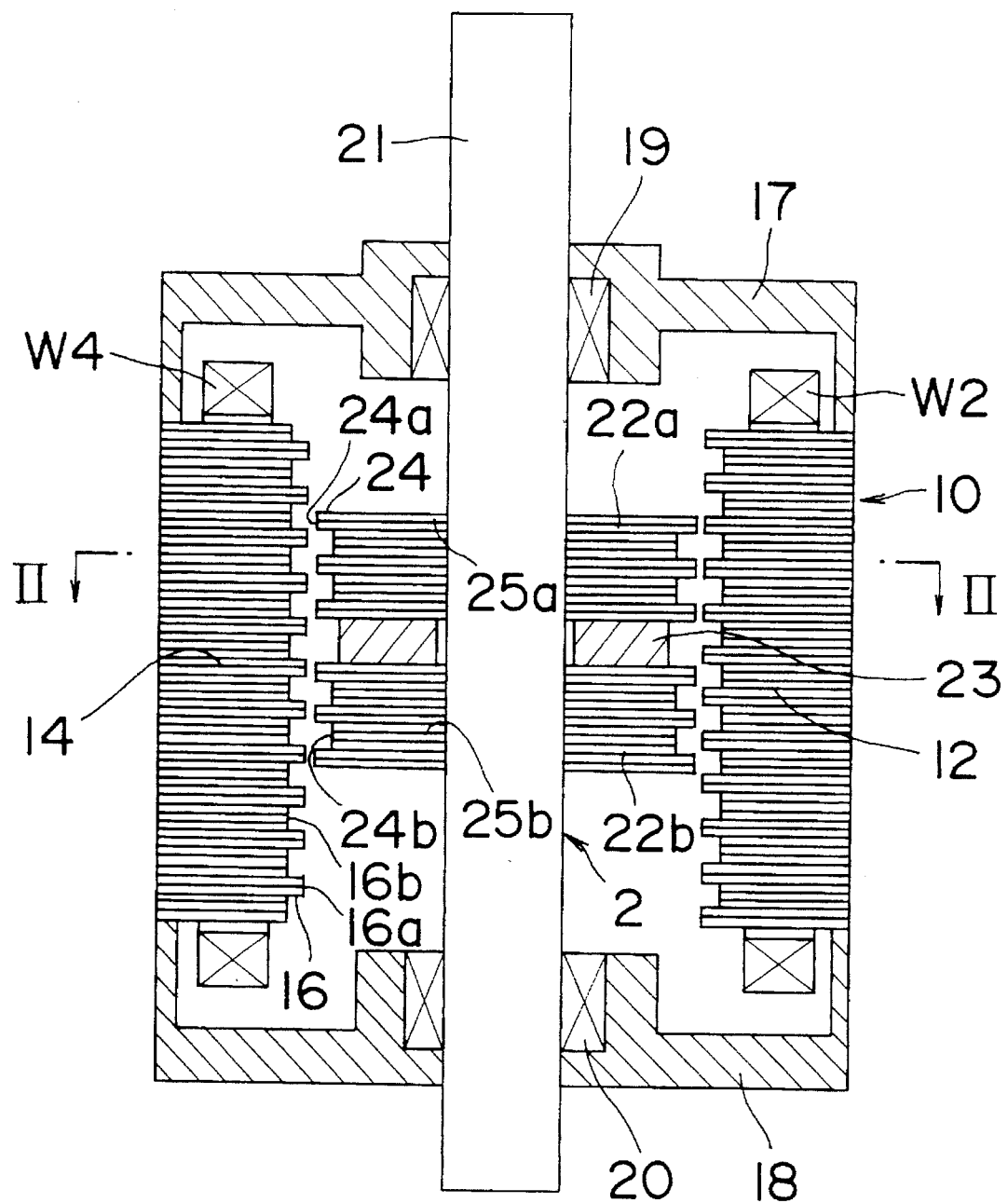
FIG. 1 is a longitudinal sectional view showing an embodiment of a linear pulse motor according to the present invention.
Figure 2:
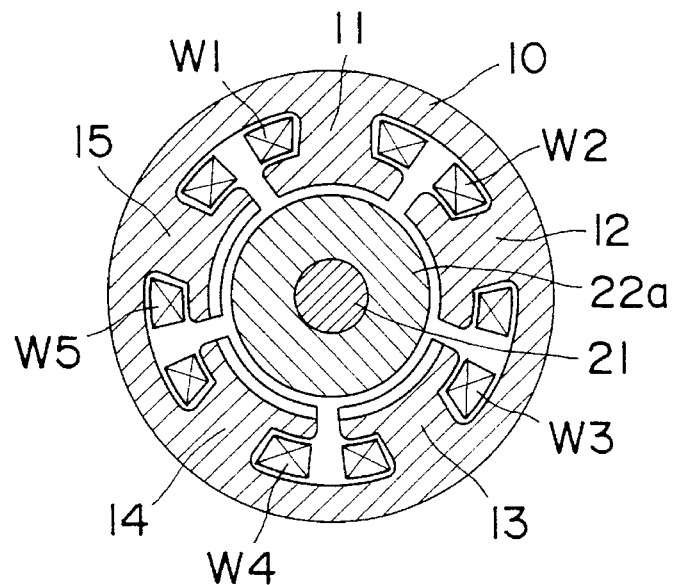
FIG. 2 is a transverse sectional view taken along line II—II of FIG. 1.

FIG. 1 is a longitudinal sectional view showing an embodiment of a linear pulse motor according to the present invention and FIG. 2 is a transverse sectional view taken along line II—II of FIG. 1.

In the embodiment, integers k and n and the number of phases m are k=1, n=2 and m=5, respectively, and accordingly the number of salient poles of a stator is k·m=5.

In FIGS. 1 and 2, a plurality of stator teeth 16 (tooth tops 16a and tooth bottoms 16b) are disposed on inner peripheral surfaces of five salient poles 11, 12, 13, 14 and 15 disposed in a stator core 10. Stator windings W1, W2, W3, W4 and W5 are wound on the five salient poles 11, 12, ... 15, respectively. The stator core is supported by brackets 17 and 18 by means of screws not shown. Accordingly, a frame of the motor is not required and a casing of the motor is not also required.

On the other hand, a mover 2 disposed within a stator 1 is movably supported by the brackets 17 and 18 through bearings 19 and 20. The mover 2 includes magnetic pole cores 22a and 22b disposed on a shaft 21 and a ring permanent magnet 23 held between the magnetic pole cores 22a and 22b and magnetized in the shaft direction.

A plurality of mover teeth 24 (tooth tops 24a and tooth bottoms 24b) are disposed on outer peripheral surfaces of the magnetic pole cores 22a and 22b in the shaft direction. Each of the magnetic pole cores 22a and 22b includes n=2 mover iron plates 25a having a large diameter and forming the tooth tops 24a and m−n=3 mover iron plates 25b having a small diameter and forming the tooth bottoms 24b which are laminated successively in turn. It is a matter of course that the magnetic pole cores 22a and 22b can be made of iron by cutting instead of the laminated mover iron plates 25a and 25b.

Figure 3:
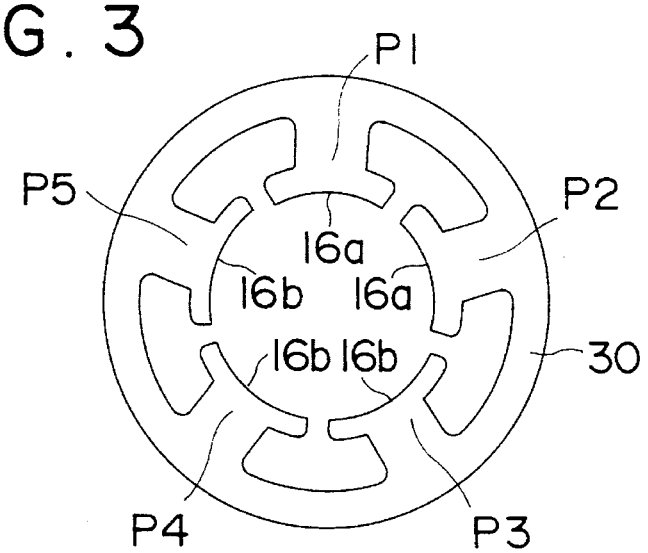
FIG. 3 is a plan view of a stator iron plate forming a stator core.

FIG. 3 illustrates an example of a stator iron plate 30 forming the stator core 10 in opposing relationship with the mover teeth 24. In FIG. 3, salient poles P1 and P2 of the stator iron plate 30 have a small radius and constitute the tooth tops 16a of the stator teeth 16 (in the embodiment n=2). Salient poles P3, P4 and P5 have a large radius and constitute the tooth bottoms 16b of the stator teeth 16 (in the embodiment m−n=3). One set (k=1 set) is constituted by arranging the salient poles P1, P2, P3, P4, P5 in succession and the stator iron plate 30 includes a set of the salient poles (k=1 set). Further, when k is 2 (k=2), the number of salient poles is 10 and the stator iron plate includes two sets of the salient poles P1, P2 and P3, P4, P5 arranged in succession.

Figure 4:
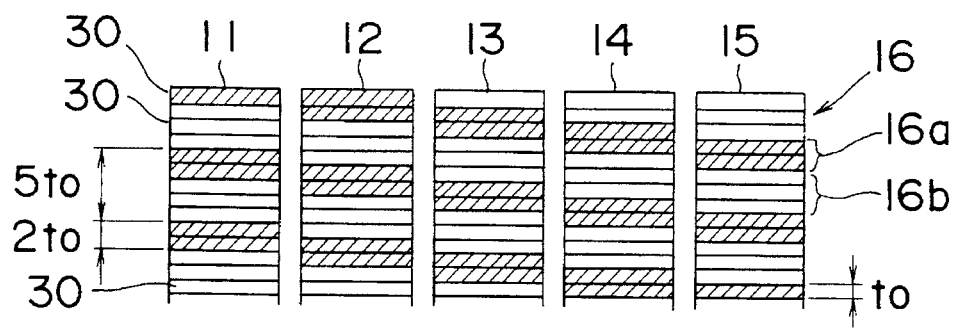
FIG. 4 is a development view of stator teeth formed by laminating the stator iron plates of FIG. 3 with the plates rotated successively by a predetermined angle as viewed from the side of a mover.

FIG. 4 illustrates the stator teeth 16 composed of the salient poles 11, 12, 13, 14 and 15 formed by laminating the stator iron plates 30 with the plates rotated by an angle θ=72 degrees as viewed from the side of a mover 2. Hatched portions indicate the tooth tops 16a and other portions which are not hatched indicate the tooth bottoms 16b. When the thickness of the stator iron plates 30 is $t_0$, the teeth 16 having a tooth pitch of m·$t_0$, that is, 5·$t_0$ (k=1 and m=5) and a tooth thickness of n·$t_0$, that is, 2·$t_0$ are formed in the salient poles 11, 12, ... 15 by the rotated and laminated structure. Further, as compared with the salient pole 11, a shift of the teeth 16 of the salient pole 12 is 1/m, that is, 1/5 of the tooth pitch, a shift of the teeth 16 of the salient pole 13 is 2/m, that is, 2/5 of the tooth pitch, a shift of the teeth 16 of the salient pole 14 is 3/m, that is, 3/5 of the tooth pitch, and a shift of the teeth 16 of the salient pole 15 is 4/m, that is, 4/5 of the tooth pitch.

The length in the shaft direction of the permanent magnet 23 disposed in the mover 2 is set so that the teeth 24 disposed in the magnetic core 22a and the teeth 24 disposed in the magnetic core 22b are shifted from each other by ½ of the tooth pitch. By connecting the windings so that the phase formed by winding W1 is A phase, the phase formed by the winding W2 is B phase, the winding W3 is C phase, the winding W4 is D phase and the winding W5 is E phase, a five-phase hybrid type linear pulse motor can be configured. A basic amount of movement in each step at this time is $1/(2 \cdot m)$, that is, $(5 \cdot t_0)/10$ of the tooth pitch which is equal to a half of the thickness $t_0$ of the stator iron plate 30.

Even when the integer k and the number of phases m are k=2 and m=5 (the number of salient poles is 10), respectively, the pitch and the tooth width of the stator teeth formed in the salient poles can be reduced to a half as compared with values attained by the conventional technique described in the above-mentioned Japanese Patent Application Nos. 332761/1992 and 340280/1992 and are $mt_0$ or $5t_0$ and $2t_0$, respectively. The basic amount of movement in each step is also $1/(2m)$ or $t_0/2$ of the tooth pitch and can attain high resolution.

Figure 5:
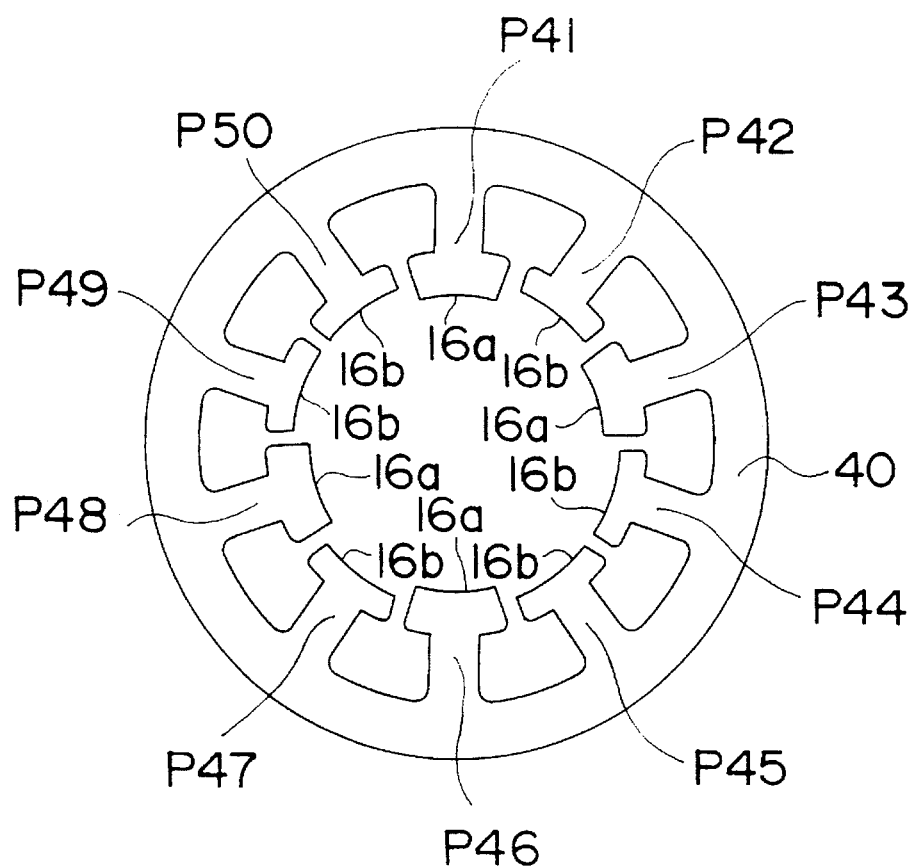
FIG. 5 is a plan view of a stator iron plate forming a stator core.

FIG. 5 illustrates an example of a stator iron plate 40 for k=2. When the number of phases m is 5, that is, m=5, the number of stator salient poles is k·m=10. In FIG. 5, salient poles P41, P43, P46 and P48 of the stator iron plate 40 have a small radius and salient poles P42, P44, P45, P47, P49 and P50 have a large radius. The salient poles P41, P42, . . . P45 and P46, P47, . . . P50 constitute a set of salient poles which is composed of two salient poles having a small radius and three salient poles having a large radius. Thus, the set of salient poles P41, P42, P43, P44, P45 and that of salient poles P46, P47, P48, P49, P50 are arranged in succession so as to form two sets (k=2) of salient poles, where each of these two sets are included in the stator iron plate. An angle between the salient poles P41 and P43 and between P46 and P48 having a small radius of the salient pole group is 144/k, that is, 72 degrees.

Figure 6:
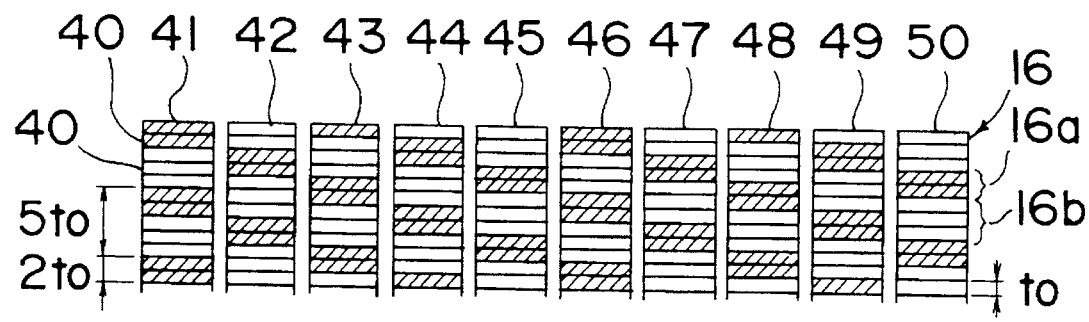
FIG. 6 is a development view of stator teeth formed by laminating the stator iron plates of FIG. 5 with the plates rotated successively by a predetermined angle as viewed from the side of a mover.
Figure 7:
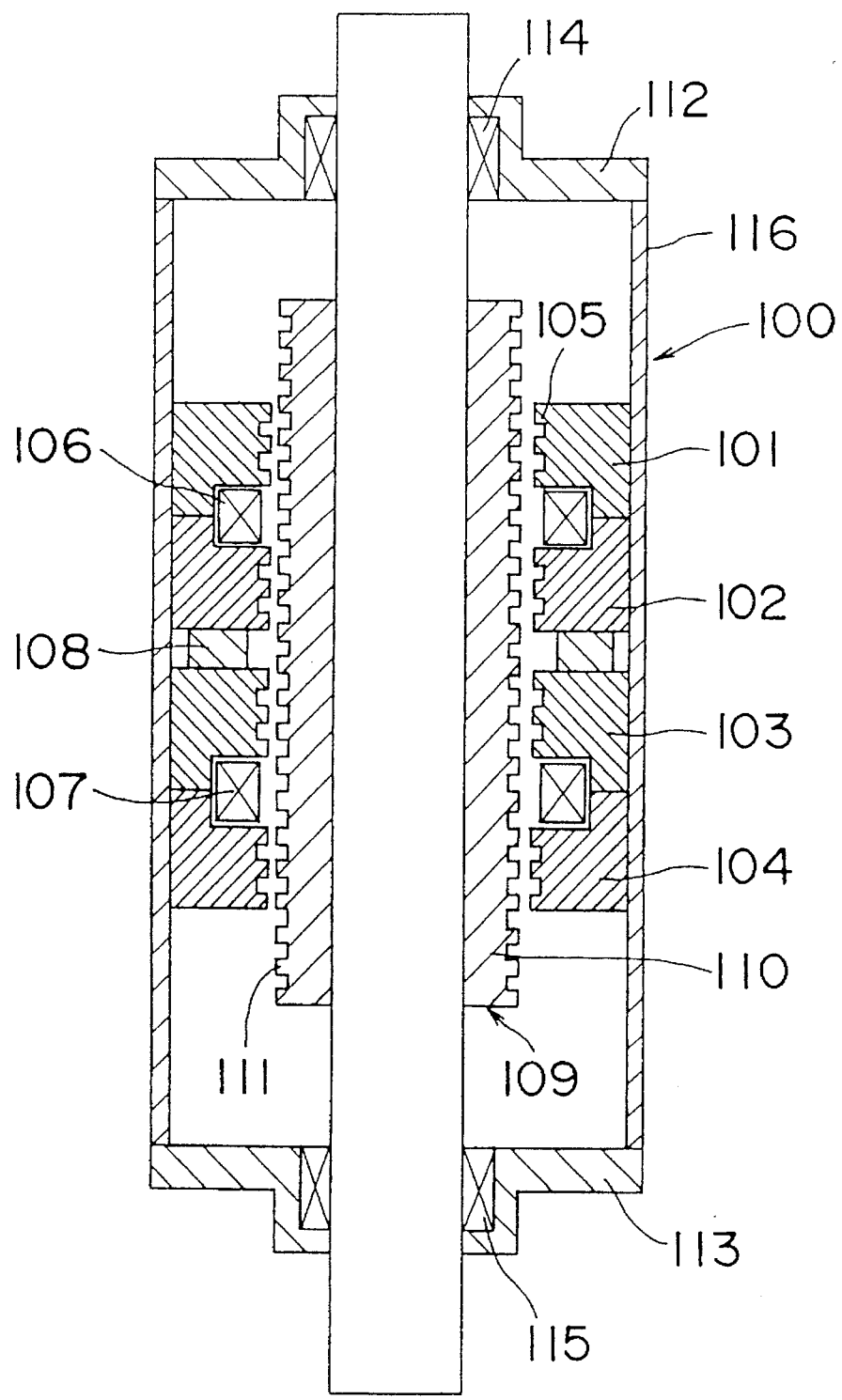
FIG. 7 is a longitudinal sectional view of a cylinder type linear pulse motor relating to the present invention.

FIG. 6 illustrates the stator teeth 16 formed by laminating the stator iron plates 40 with the plates rotated by the angle of 72 degrees similarly to FIG. 4. With such a rotated and laminated structure, the teeth 16 having a tooth pitch of $5t_0$ and a tooth width of $2t_0$ are formed in the salient poles 41, 42, . . . 50. Furthermore, the teeth 16 formed in adjacent salient poles are shifted from each other by 2/5 or 3/5 of the tooth pitch.

Accordingly, windings wound on the salient poles 41, 42, . . . 50 of the stator opposite to each other can be connected to make one phase so that a five-phase hybrid type linear pulse motor can be configured. In this case, the basic amount of movement in each step is $1/(2 \cdot m)$, that is, $t_0/2$ of the tooth pitch similarly to FIG. 4.

The techniques of the present invention are not limited to the techniques of the embodiment and may be attained by another means achieving the same function. Further, various modification and addition can be made to the techniques of the present invention within a range of the above configuration.

I claim:

1. In a linear pulse motor including a stator having a stator core provided with a plurality of salient poles disposed at equal pitch angle to be directed inward radially and a plurality of stator teeth disposed in a direction of a shaft in inner peripheral surfaces of said salient poles, a mover having a mover core supported in said stator movably in the shaft direction and provided with a plurality of mover teeth formed in an outer peripheral surface thereof at equal pitch in opposing relationship with said stator teeth, and a permanent magnet held intermediate of said stator core or said mover core and magnetized in the shaft direction, the improvement comprising:

said stator core comprises stator iron plates being laminated while rotated successively by the equal pitch angle of said salient poles and, when k is an integer equal to or larger than 1, m is the number of phases, and n is an integer equal to or smaller than m/2 and nearest to m/2, said stator iron plates include km salient poles, k sets of salient poles each set consisting of n salient poles having a small inner radius and (m-n) salient poles having a large inner radius, as seen from the side of said mover, the top ends of said salient poles being so arranged successively in turn as to confront said mover.

2. In a linear pulse motor including a stator having a stator core provided with a plurality of salient poles disposed at equal pitch angle to be directed inward radially and a plurality of stator teeth disposed in a direction of a shaft in inner peripheral surfaces of said salient poles, a mover having a mover core supported in said stator movably in the shaft direction and provided with a plurality of mover teeth formed in an outer peripheral surface thereof equal pitch in opposing relationship with said stator teeth, and a permanent magnet held intermediate of said stator core or said mover core and magnetized in the shaft direction, the improvement comprising:

said stator core comprises stator iron plates being laminated while rotated successively by the equal pitch angle of said salient poles, and when k is an integer equal to or larger than 1, m is the member of phases, and n is an integer equal to or smaller than m/2 and nearest to m/2, said stator iron plates include km salient poles, k sets of salient poles each set consisting of n salient poles having a small inner radius and (m-n) salient poles having a large inner radius, as seen from the side of said mover, the top ends of said salient poles being so arranged successively in turn as to confront said mover wherein said liner pulse motor is a five-phase hybrid type linear pulse motor having said k, m and n being k=1, m=5 and n=2, respectively.

3. In a linear pulse motor including a stator having a stator core provided with a plurality of salient poles disposed at equal pitch angle to be directed inward radially and a plurality of stator teeth disposed in a direction of a shaft in inner peripheral surfaces of said salient poles, a mover having a mover core supported in said stator movably in the shaft direction and provided with a plurality of mover teeth formed in an outer peripheral surface thereof at equal pitch in opposing relationship with said stator teeth, and a permanent magnet held intermediate of said stator core or said mover core and magnetized in the shaft direction, the improvement comprising:

said stator core comprises stator iron plates being laminated while rotated successively by the equal pitch angle of said salient poles, and when k is an integer equal to or larger than 1, m is the number of phases, and n is an integer equal to or smaller than m/2 and nearest to m/2, said stator iron plates include km salient poles, k sets of salient poles each set consisting of n salient poles having a small inner radius and (m-n) salient poles having a large inner radius, as seen from the side of said mover, the top ends of said salient poles being so arranged successively in turn as to confront said mover wherein said linear pulse motor is a five-phase hybrid type linear pulse motor having said k, m and n being k=2, m=5 and n=2, respectively.

4. In a linear pulse motor including a stator having a stator core provided with a plurality of salient poles disposed at equal pitch angle to be directed inward radially and a plurality of stator teeth disposed in a direction of a shaft in inner peripheral surfaces of said salient poles, a mover having a mover core supported in said stator movably in the shaft direction and provided with a plurality of mover teeth formed in an outer peripheral surface thereof at equal pitch in opposing relationship with said stator teeth, and a permanent magnet held intermediate of said stator core or said mover core and magnetized in the shaft direction, the improvement comprising stator iron plates of said stator core include 5k salient poles when k is an integer equal to or larger than 1, and k sets of salient poles each set including 2 salient poles having a small inner radius and 3 salient poles having a large inner radius arranged are formed in top ends of said salient poles opposite to said mover as viewed from the side of said mover, an angle between said two salient poles having a small inner radius of the salient poles constituting said set being 144/k degrees, said stator core including said stator iron plates laminated while rotated successively by 144/k degrees.

* * * * *